United States Patent [19]

Marsh et al.

[11] Patent Number: 5,428,722
[45] Date of Patent: Jun. 27, 1995

[54] OBJECT-ORIENTED PAINTER MAKER

[75] Inventors: Donald M. Marsh, Mountain View; Ralph T. Watson, Cupertino, both of Calif.

[73] Assignee: Taligent, Inc., Cupertino, Calif.

[21] Appl. No.: 148,051

[22] Filed: Nov. 5, 1993

[51] Int. Cl.⁶ .......................................... G06F 15/62
[52] U.S. Cl. .................................................. 395/133
[58] Field of Search ............... 395/133, 155, 161, 134, 395/135, 136; 345/113, 118, 121, 127

[56] References Cited

U.S. PATENT DOCUMENTS

| | | | |
|---|---|---|---|
| 4,821,220 | 4/1989 | Duisberg | 364/578 |
| 4,885,717 | 12/1989 | Beck et al. | 364/900 |
| 4,891,630 | 1/1990 | Friedman et al. | 340/706 |
| 4,953,080 | 8/1990 | Dysart et al | 364/200 |
| 5,041,992 | 8/1991 | Cunningham et al. | 364/518 |
| 5,050,090 | 9/1991 | Golub et al. | 364/478 |
| 5,060,276 | 10/1991 | Morris et al. | 382/8 |
| 5,075,848 | 12/1992 | Lai et al. | 395/425 |
| 5,093,914 | 3/1992 | Coplien et al. | 395/700 |
| 5,119,475 | 6/1992 | Smith et al. | 395/156 |
| 5,125,091 | 6/1992 | Staas, Jr. et al. | 395/650 |
| 5,133,075 | 7/1992 | Risch | 496/800 |
| 5,136,705 | 8/1992 | Stubbs et al. | 395/575 |
| 5,151,987 | 9/1992 | Abraham et al. | 395/575 |
| 5,181,162 | 1/1993 | Smith et al. | 364/419 |
| 5,347,620 | 9/1994 | Zimmer | 395/129 |

OTHER PUBLICATIONS

Proceedings Visualization, Oct. 19, 1992, Los Alamitos, Calif., US, pp. 219-226, Schroder, "Visage: An Object-Oriented Scientific Visualization System".

Computer, V.22(10), Dec. 1989, Long Beach, US, pp. 43-54, Goodman "Knowledge-Based Computer Vision".

Computer, V.10(1), Jan. 1990, Bromley, GB, pp. 31-32, Drake, "Objects and Images".

Computers And Graphics, v.13(3), 1989, Oxford GB, pp. 321-327, Fiume, "Active Objects in the Construction of Graphical User Interfaces".

*Primary Examiner*—Phu K. Nguyen
*Attorney, Agent, or Firm*—Keith Stephens

[57] ABSTRACT

A computer based system for rendering a plurality of graphical environments includes a plurality of painter maker objects, and a painter maker chain comprising at least one of the painter maker objects. A task, which is coupled to the painter maker chain, passes to the painter maker chain a request to render a particular graphical primitive in a particular graphical environment. In response to the request, the painter maker objects create a painter chain comprising a plurality of painter objects each optimized to perform, in the particular graphical environment, a predetermined graphical operation in order to render the particular graphical primitive. The task uses painter objects to perform rendering operations in the particular graphical environment.

52 Claims, 7 Drawing Sheets

OBJECT-ORIENTED PAINTER MAKER

A portion of the disclosure of this patent application contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention is directed to computer based graphics systems and methods, and more particularly to computer based, object oriented painter makers and painters.

RELATED ART

Rendering routines (also called rendering software, rendering programs, and render code) are executed in computer systems to draw graphical primitives, such as polygons, rectangles, lines, circles, etc. Computer systems often comprise many graphical environments having different graphical characteristics, such as different output devices and different rendering requirements. For example, in one graphical environment, the output device may be a frame buffer display device (frame buffer display devices are well known). In another graphical environment, the output device may be a printer, a plotter, a non-frame buffer display device, or an offscreen buffer. Also, some graphical environments may have different rendering requirements (such as the need to perform clipping) than other graphical environments.

As will be appreciated, the software necessary to draw graphical primitives in one graphical environment will most likely differ from the software necessary to draw graphical primitives in other graphical environments. This is the case, since different graphical environments have different graphical characteristics.

In some conventional computer based graphics systems, rendering routines are provided for each graphical environment. For example, in a graphics system comprising a first graphical environment (having, for example, a frame buffer output device) and a second graphical environment (having, for example, a printer output device), two draw-rectangle rendering routines would be provided, one for each of the graphical environments. These draw-rectangle rendering routines would be specific to their respective graphical environments. However, providing rendering routines for each graphical environment is not an ideal solution since it requires additional complexity to be integrated into programs.

In other conventional computer based graphics systems, a limited number of rendering routines are provided, wherein each of the rendering routines includes graphical environment-specific code for all of the graphical environments. The execution of such graphical environment-specific code is based on the execution of conditional statements (such as "if-then-else" statements) which are also contained in the rendering routines. However, providing a limited number of rendering routines, each having graphical environment-specific code for all of the graphical environments, is not an ideal solution since the resulting rendering routines are complex and difficult to develop and maintain.

SUMMARY OF THE INVENTION

The present invention is directed to object oriented painters for drawing (or rendering, or painting) graphical primitives in various graphical environments, and to object oriented painter makers for selecting and linking such painters in accordance with the graphical characteristics of the graphical environments. The painter makers, and more particularly the painter maker architecture of the present invention, abstracts the differing functionality that is necessary to handle the graphical characteristics of different graphical environments, such as pixel painting, clipping, region creation, multi-thread synchronization, painter caching, and interactive compositing. By hiding these functions from the rendering code, it is possible to use the same rendering code in a variety of situations. The painter maker architecture also supports dynamic usage of multiple painters in cases where more than one is needed to paint in a given situation.

More particularly, the present invention is directed to a computer based system for rendering a plurality of graphical primitives in a plurality of graphical environments. The system includes a plurality of painter maker objects, and a painter maker chain comprising at least one of the painter maker objects. A rendering routine requests a painter maker in device cache to create a painter of a given type. The painter maker returns a painter of the requested type that will function properly in the current environment. Painters are pixel processors used primarily for frame buffer devices in a preferred embodiment. However, the painter functionality is rich enough to support non-frame buffer devices also. The painter maker objects in the painter maker chain create, in response to receipt of the graphical rendering request, a painter chain comprising a plurality of painter objects each optimized to perform, in the particular graphical environment, a particular graphical operation with respect to rendering the particular graphical primitive. The task uses painter objects generated by the painter maker objects in the painter maker chain to perform rendering operations in the particular graphical environment.

The present invention has a number of advantageous features. For example, new painters can be created and painter creations are extensible. Accordingly, renderers are not required to adapt to changing painters (e.g., to render into a region vs. a pixel buffer or to perform compositing). Also, different kinds of painters may be used together, and are not required to know about one another. Preferably a renderer calls a single, well-known source for its painters. This source abstracts the type of painting employed. This single source is herein called a painter maker.

Also, the present invention binds as many "painting variables" as possible before painting begins via polymorphism. "Hooks" are provided so that the painter maker can cache objects that are used on a recurring basis. Caching is transparent to renderers. Also, response time for sprites is optimized by ensuring that time consuming rendering steps occur outside of the scope in which portions of the screen are locked for multi-thread safe rendering. Therefore, the present invention achieves high performance painting.

Painting is inherently complex. In accordance with the present invention, such complexity is hidden from the renderer. Dynamic storage is allocated through a stack-based cleanup object so that exception processing can do appropriate clean-up.

The present invention provides features for policing the use of painters and related objects (such that painters and related objects are used in the correct manner), and provides other features for detecting incorrect usage (when proper usage is not being enforced due to performance considerations, for example).

Further features and advantages of the present invention, as well as the structure and operation of various embodiments of the present invention, are described in detail below -with reference to the accompanying drawings.

BRIEF DESCRIPTION OF THE DRAWINGS

The present invention will be described with reference to the accompanying drawings, wherein.

DETAILED DESCRIPTION OF THE PREFERRED EMBODIMENTS

1. Overview of the Present Invention

Figure 1:
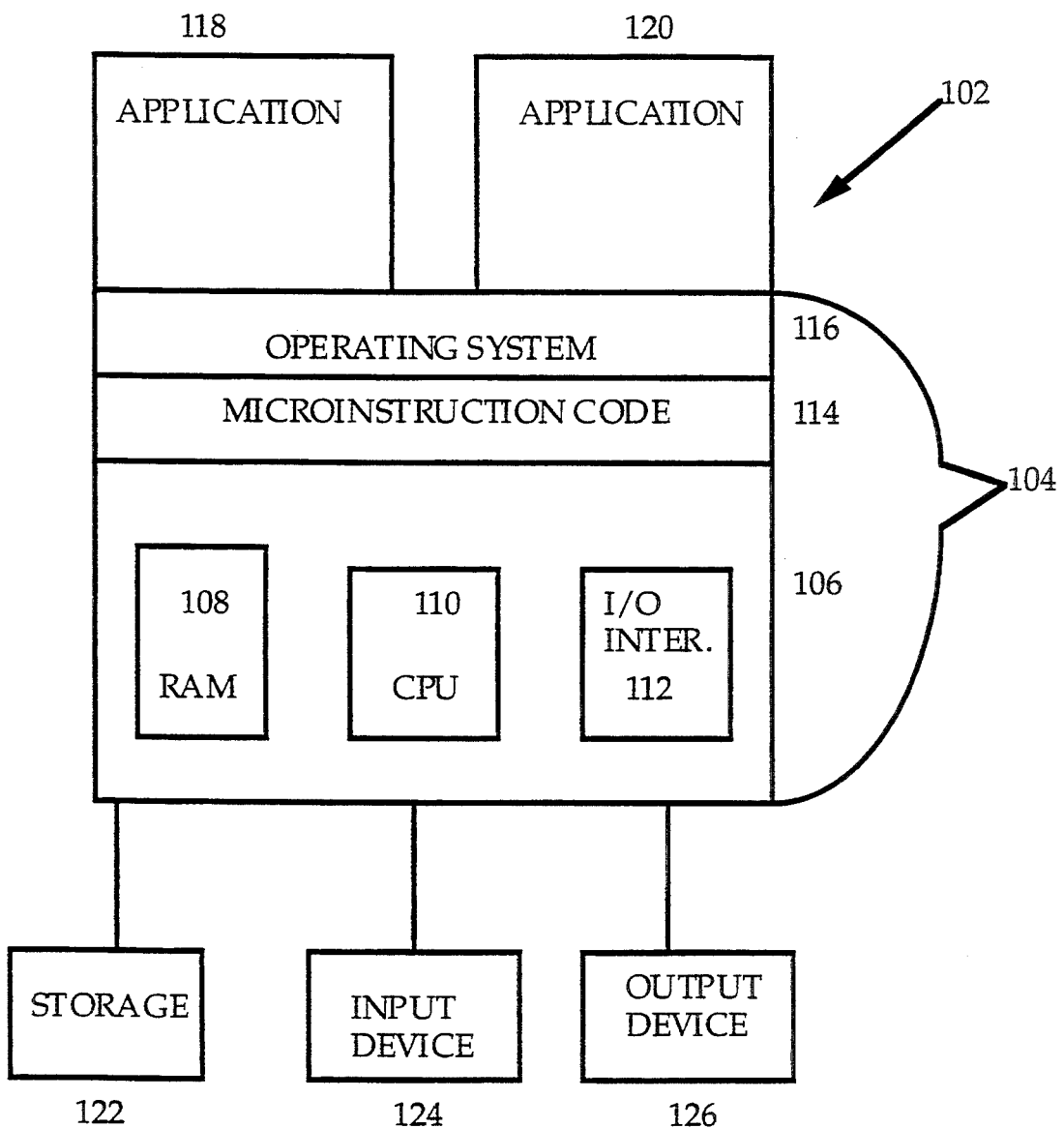
FIG. 1 is a high level, structural block diagram of a preferred embodiment of the present invention.

FIG. 1 is a high level, structural block diagram of a computer system 102 of the present invention. The computer system 102 includes a computer platform 104 which comprises hardware components 106, such as a random access memory (RAM) 108, a central processing unit (CPU) 110, and an input/output (I/O) interface 112. It should be noted that the CPU 110 may represent a single processor, or may alternatively represent multiple processors operating in parallel.

The computer system 102 also includes peripheral devices which are connected to the hardware components 104. These peripheral devices include an input device or devices 124 (such as a keyboard, a mouse, a light pen, etc.), a data storage device 122 (such as a hard disk or floppy disk), and an output display device or devices 126 (such as a frame buffer display device, a printer, a plotter, an offscreen buffer, etc.).

The computer platform 104 also includes an operating system 116, and may include microcode 116. The operating system 116 may represent a substantially full-function operating system, such as the Disk Operating System (DOS) and the UNIX operating system. However, the operating system 116 may represent other types of operating systems, such as a limited functionality procedural operating system, such as the Mach micro-kernel developed by IBM, which is well-known to those skilled in the relevant art.

In a preferred embodiment of the present invention, the computer platform 104 is an International Business Machines (IBM) computer or an IBM-compatible computer. In an alternate embodiment of the present invention, the computer platform 104 is an Apple computer. Operating on the computer platform 104 are application programs 118, 120. The application programs 118, 120 each contain drawing instructions which, when executed in the computer platform 104, render graphic primitives on the output display devices 126.

Figure 2:
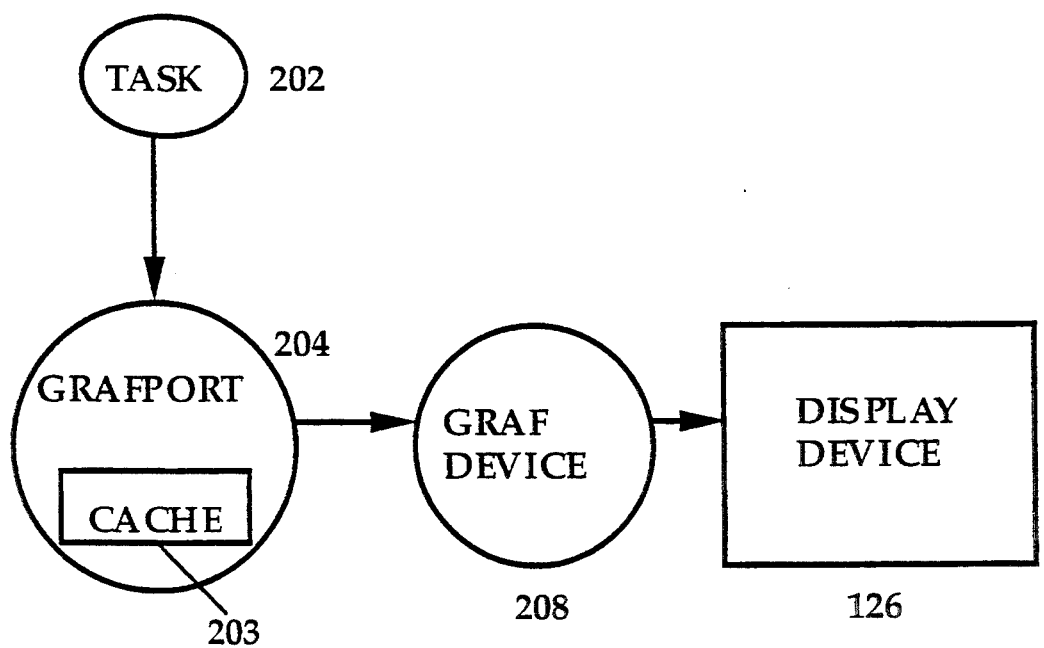
FIG. 2 depicts message passing between objects when a task renders to a display device in accordance with a preferred embodiment of the present invention.

Preferably, a number of objects are involved in the rendering of graphic primitives on *the output display devices 126. The flow of messages in performing such rendering is depicted in FIG. 2. Preferably, a task 202 (an application program, when it is being executed, is represented by one or more tasks) calls a primitive drawing message to a grafport object 204. The primitive drawing message specifies the type of primitive to draw (such as a rectangle) and the attributes of the primitive to be drawn (such as the color and/filling and/or framing or line type).

A grafport object 204 is associated with each task, and it represents a window through which a task can communicate with display devices 126. The grafport object 204 abstracts the functionality associated with accessing display devices, and therefore simplifies the rendering code contained in the task 202. The grafport object 204 includes a cache 203 which represents task specific graphical information, such as display pixel information. It is necessary to maintain the cache 203 in the grafport 204, since many tasks may render to the display device 126. Although the grafport maintains storage for the cache, the display device stores information to accelerate subsequent renderings by the task. GrafDevices are made multithread safe by keeping thread-specific data (the cache) in grafports and passing this data into the grafdevice with each rendering call.

In response to receiving the primitive drawing message from the task 202, the grafport 204 sends a message to a grafdevice object 208 to cause the grafdevice object 208 to execute a rendering method defined by the grafdevice object 208 (and identified by the message). The message sent from the grafport 204 to the grafdevice 208 includes the cache 203.

A grafdevice 208 is associated with a number of display devices 126, and abstracts the functionality of the display device 126. In this manner, tasks and grafports need not know the technical details of display devices in order to work with the display devices. Since the interface of all grafdevices is the same, grafports can easily operate with all display devices by sending appropriate messages to the associated grafdevices.

Figure 3:
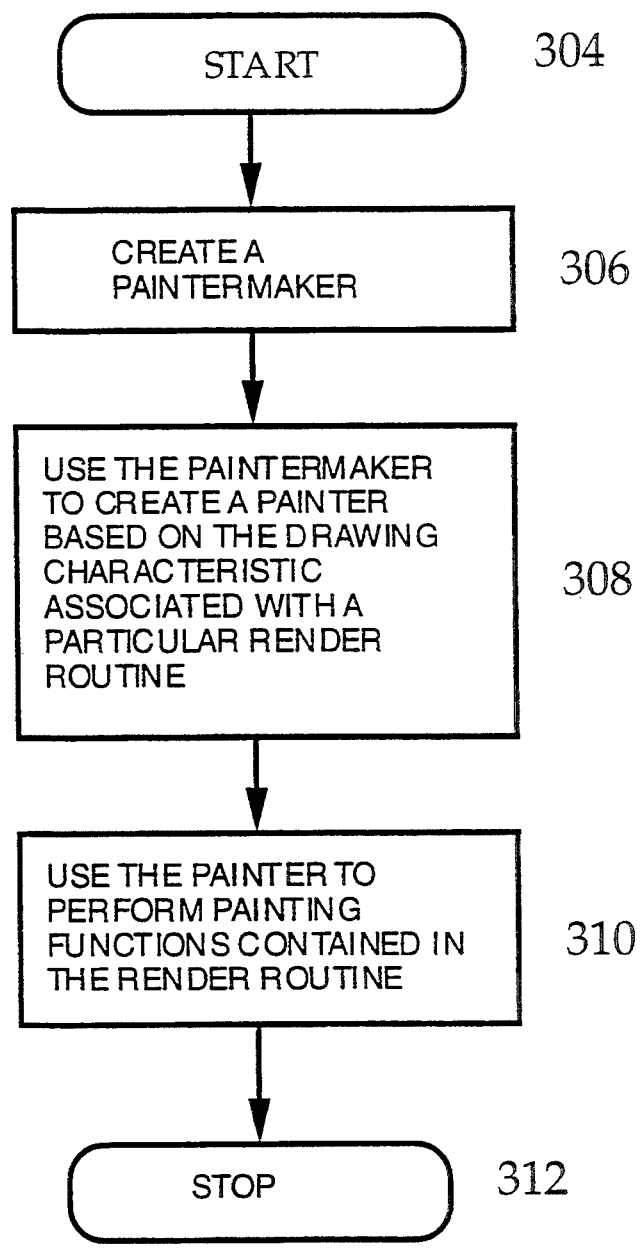
FIG. 3 is a flow chart depicting the operation of the present invention.

In response to receiving the message from the grafport 204, the grafdevice object 208 executes the rendering method identified by the message. Referring to FIG. 3, which is a flow chart depicting the high level operation of the present invention, during the execution of the rendering method, a painter maker chain associated with the task 202 is used to generate a chain of painters (step 308). The painter maker chain was previously generated (step 306). The rendering method uses this painter chain to render to the display device 126 (step 310). This operation is further described below. First, however, painters and painter makers shall be described in the following sections.

2. Painters

A painter is an object which performs a particular graphical rendering operation. For example, some painters (called span painters) are associated with rendering spans, which are one pixel high, horizontal lines. Other painters (called hairline painters) are associated with rendering hairlines, which are lines having any orientation and having a thickness equal to the minimum thickness of the display device to which the hairlines are being displayed. Glyph painters are associated with rendering glyphs, which are characters. Three dimensional (3D) span painters are associated with rendering spans in accordance with 3D models (for example, applying a shading model to a span).

By defining highly specialized painters having a limited functionality (with respect to the types of graphical primitives which they are responsible for rendering), the painters of the present invention can be highly optimized to achieve high performance in graphical rendering. This is very important in interactive graphical systems.

In addition to being specialized with regard to the types of graphical primitives which they render, the painters of the present invention are specialized with regard to the types of operations which they perform on their respective graphical primitives. For example, consider span painters. Some span painters (called clipping span painters) deal with clipping. Clipping span painters facilitate rendering in a specified "clipping area". Windows are one example of an application of clipping. Clipping areas can be employed to implement overlapping windows.

Some span painters (called composite span painters) deal with compositing. Composite span painters ensure that no more than one task renders to any portion of any display device at any one time. The screen painter maker ensures that no more than one task renders to a given rectangular area of a device at a time. Also, composite span painters integrate the rendering of sprites (such as a blinking cursor, or a moving window) and spans, such that graphical anomalies do not occur. Composite span painters do this by rendering graphical data which represents the combination of both the span data and the sprite (rather than rendering the span data on top of the sprite).

Other span painters (called pixel span painters) deal with rendering into display device pixel buffers. By having painters which are specialized both with respect to the types of graphical primitives which they render, and the types of operations on the graphical primitives which they perform, the painters of the present invention can be very optimized, thereby enhancing performance. Painter makers ensure that only those painters that are involved in a particular rendering are included in the painter chain. If no clipping is required for a particular rendering operation, then no clipping painter would be included in the painter chain.

Figure 4A:
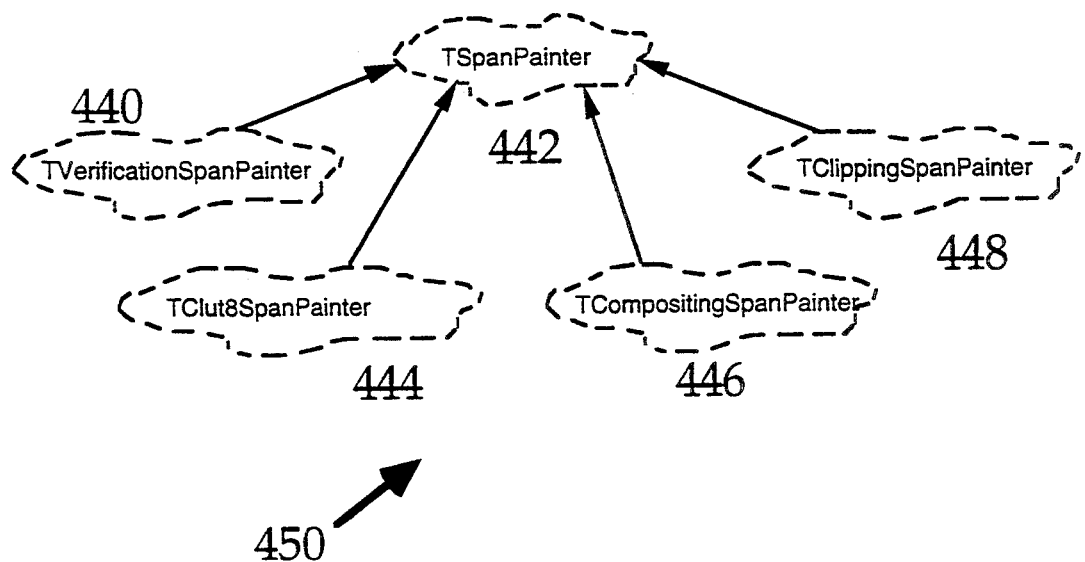
FIG. 4A is a painter class diagram in accordance with a preferred embodiment.
Figure 6:
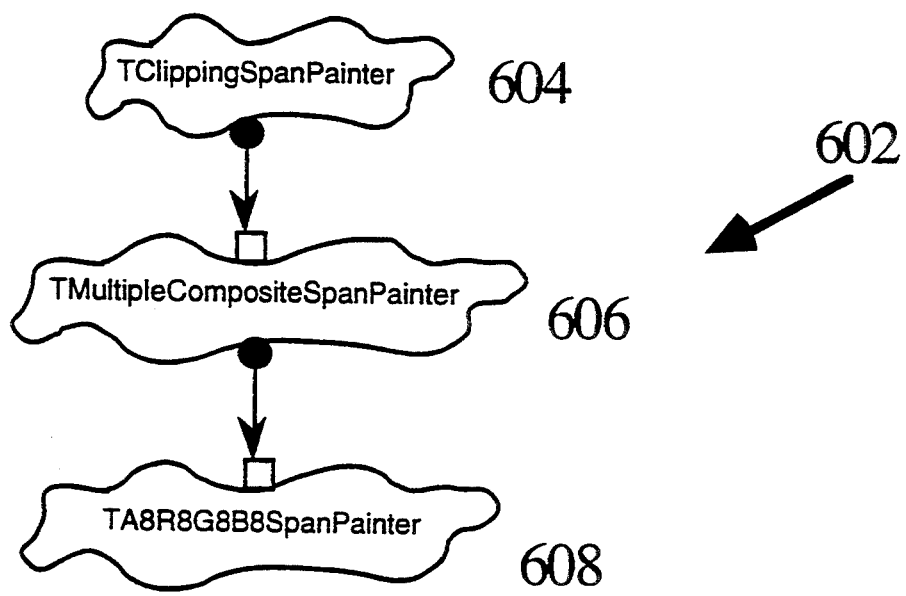
FIG. 6 illustrates an example painter chain.

As discussed below, the painter makers of the present invention create a chain of painters depending on the characteristics of the graphical environment in which the rendering is being done. This painter chain is then used by the rendering routine to render to the display device 126. FIG. 6 depicts an example painter chain. Preferably, an object oriented painter base class is defined for each of a standard and non-extensible type of painting used to render geometries. For example, there is a class for span painters, a class for hairline painters, a class for glyph painters, and a class for 3D span painters. All painters associated with rendering a particular graphical primitive type are instantiated using the painter class pertaining to that particular graphical primitive type. FIG. 4A illustrates a model for a painter class in accordance with a preferred embodiment. The classes, such as TVerificationSpanPainter 440, derive from the base class TSpanPainter 442. Thus, all of the classes have a common protocol. For example, the clipping span painter, the composite span painter, and the pixel span painter are all objects instantiated using the span painter class. Class methods are overridden as necessary. Code Example 1 presents the interface (in the C++ computer programming language) of the glyph painter class in accordance with a preferred embodiment of the present invention. The interfaces and implementation of other painter classes will be apparent to persons skilled in the relevant art.

```
/*================
||Copyright © 1993 Taligent, Inc.
*/
class TBitmapGlyphPainter : public MCollectible{
  public:
    TBitmapGlyphPainter(const TBitmapGlyphPainter& source);
    virtual ~TBitmapGlyphPainter();
    virtual void PaintGlyph(
        GDevCoordinate dsty,
        GDevCoordinate dstx,
        const TGlyphPixmapMetrics& metrics,
        GlyphPixmapPtr pixmapbits ) = 0;
    virtual void PaintGlyph(
        GDevCoordinate dsty,
        GDevCoordinate dstx,
        const TGlyphPixmapMetrics& metrics,
        GlyphPixmapPtr pixmapbits,
        const TLongRect&recClipper ) = 0;
    virtual void SetAll(
        TPixelBuffer &buffer,
        const TNewGrafState& grafstate,
        const TGrafMatrix &devicexform,
        const TLongRect &bounds,
        const TPaint &paint,
        const TTransferMode &transferMode) = 0;
    //===Base Functionality===
    const TBitmapGlyphPainter& operator=const TBitmapGlyphPainter& source
    Boolean    operator==(const TBitmapGlyphPainter& source const;
    // ===MCollectible ===
    VersionDeclarationsMacro (TBitmapGlyphPainter);
```

```
    virtual TStream& operator>>=(TStream&) const;
    virtual TStream& operator<<=(TStream&);
    virtual Boolean IsEqual(const MCollectible* obj) const;
    protected:
        TBitmapGlyphPainter();
};
```
Code Example 1

3. Painter Makers

Painter makers provide a fixed interface for acquiring painters of standard types which may not be extended. Painters of these standard types may be specialized and chained to build painters with standard interfaces that have new, extended behavior. The painter maker builds painters this way to create painters that are optimized for the current rendering requirements.

Figure 4B:
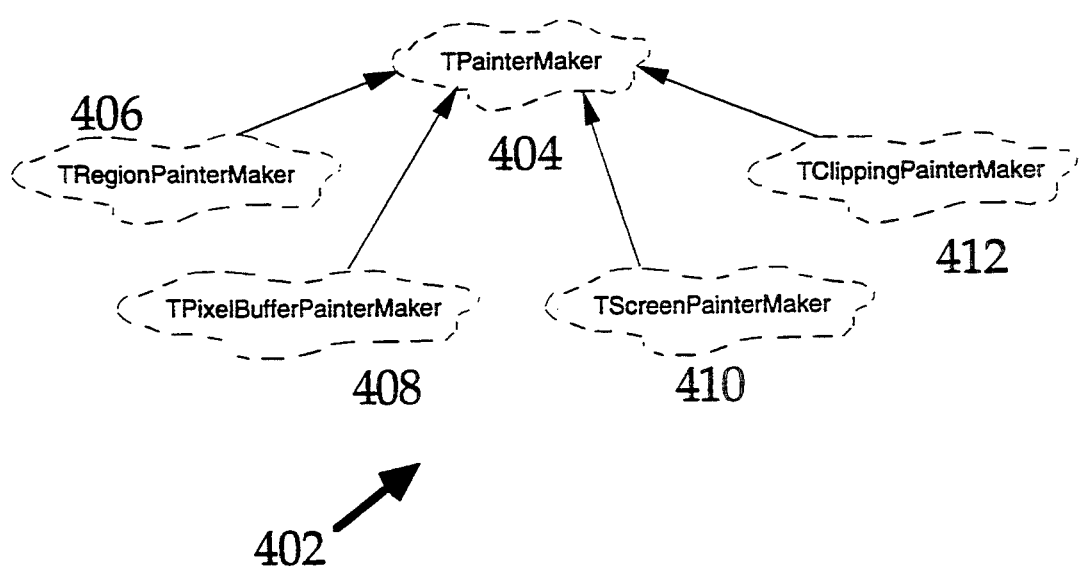
FIG. 4B is a painter maker class diagram in accordance with a preferred embodiment of the present invention.

The scope of the present invention also includes other types of painter makers, as shown in FIG. 4. The region painter maker 406 in FIG. 4 is associated with creating regions in a display device dependent manner. The screen painter maker 410 is associated with coordinating access to a display device in rectangular segments. The screen painter maker 410 also deals with compositing. A region is a data structure used to perform fast clipping operations on a frame buffer device. The region records which pixels are modified during a rendering operation, but ignores other information such as pixel color or transparency. A region painter maker creates a special region painter that is optimized to record this type of information in the region data structure.

Figure 5:
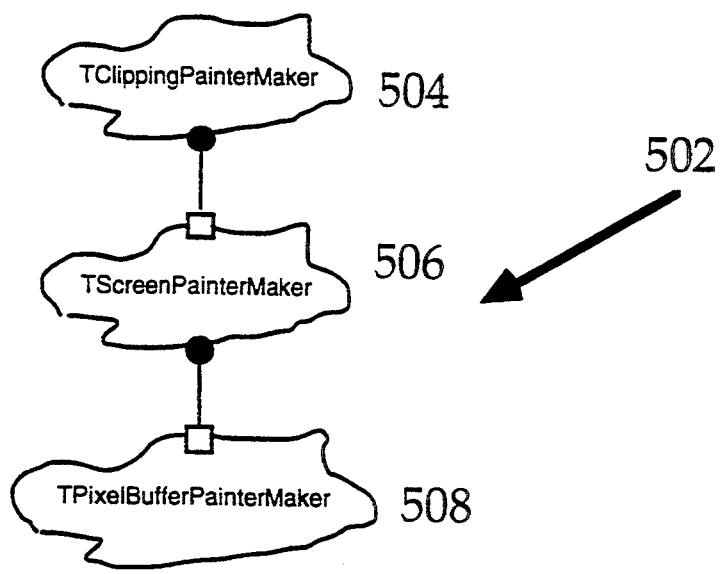
FIG. 5 illustrates an example painter maker chain.

Screen painter makers coordinate multitask access to a shared display device. When a task needs to modify pixels on the device, the screen painter maker identifies intersections which composited elements such as software cursors and sprites. If any intersections are identified, the screen painter maker creates special compositing painters that can resolve conflicts as they occur. Preferably, the device cache 203 (FIG. 2) and the rendering routines see the painter maker as a single object. However, in practice there are any number of painter makers that are chained beneath the top painter maker. Each painter maker in the chain knows only of the next one in the chain, and only knows of it abstractly as a TPainterMaker (FIG. 4). FIG. 5 illustrates an example painter maker chain.

All painter makers are preferably objects instantiated from a single painter maker class (as illustrated in FIG. 4). The interface of the painter maker class in accordance with a preferred embodiment of the present invention is presented in Code Example 2.

```
/*================
||
||File: PainterMaker.h
||
||What: Base class that retrieves painters for frame buffers.
||
||Copyright © 1993 Taligent, Inc.
*/
class TPainterMaker t
    public:
        enum ENumberOfPainters {kMaxSimultaneousPainters = 2 };
        virtual ~TPainterMaker ();
        virtual void UsePaint (
            const TL4ongRect& bounds,
            const TPaint * paint,
            const TTransferMode * transfermode,
            const TSpanPainter* paintclass,
            const TNewGrafState& grafstate,
            int whichpaint =() = 0;
        virtual void UsePaint (
            const TLongRect& bounds,
            const TPaint * paint,
            const TTransferMode * transfermode,
            const THairlinePainter* paintclass,
            const TNewGrafState& grafstate,
            int whichpaint = 0) = 0;
        virtual void UsePaint (
            const TLongRect& bounds,
            const TPaint * paint,
            const TTransferMode * transfermode,
            const TBitmapGlyphPainter* paintclass,
            const TNewGrafState& grafstate,
            int whichpaint = 0) = 0;
        virtual void UsePaint (
            const TLongRect& bounds,
            const TShader * shader,
            const T3DSpanPainter* paintclass,
            const TNewGrafState& grafstate,
            int whichpaint = 0) = 0;
        virtual void DoneWithPaints () = 0;
        virtual void StartDrawing (
            const TLongRect& bounds,
            unsigned long& boundsbottom,
            TSpanPainter*& activepainter,
```

-continued

```
      int whichpaint = 0) = 0;
    virtual void StartDrawing (
      const TLongRect& bounds,
      unsigned long& boundsbottom,
      THairlinePainter*& activepainter,
      int whichpaint = 0) = 0;
    virtual void StartDrawing (
      const TLongRect& bounds,
      unsigned long& boundsbottom,
      TBitmapGlyphPainter*& activepainter,
      int whichpaint = 0) = 0;
    virtual void StartDrawing (
      const TLongRect& bounds,
      unsigned long& boundsbottom,
      T3DSpanPainter*& activepainter,
      int whichpaint = () = 0;
    virtual void StopDrawing () = 0;
    // methods for pixel streamers
    enum EPixelStreamReaderRequest (
      kNoReaderNeeded,
      kSomeReaderRequired,
      kARGBReaderRequired,
      kAlphaGrayReaderRequired
    virtual TPixelStreamReader* InitializeStreamers (
      const TLongRect& bounds,
      const TTransferMode* transfermode,
      const TGImage &srcpixels,
      const TPixelBuffer &dstpixels,
      EPixelStreamReaderRequest readerrequest,
      const TNewGrafState& grafstate) = 0;
    virtual void DoneWithStreamers () = 0;
    virtual void StartPixelTransfer
      const TLongRect& bounds,
      unsigned long& boundsbottom,
      TPixelStreamWriter*& writer) = 0;
    virtual void StopPixelTransfer () = 0;
  protected:
    TPainterMaker();
};
inline TPainterMaker::TPainterMaker()
{
}
inline TPainterMaker::~TPainterMaker()
{
}
#endif
Code Example 2
```

Paintermakers are used to create painters. In the simplest case, a painter may be a single pixel buffer painter that writes directly to a pixel buffer. But in more complicated painting scenarios, the painter returned by the painter maker chain may actually be the first in a chain of painters, each playing an isolated role in the painting process. For example, the first may eliminate painting to clipped areas, while the second composites painting with an overlapping cursor and the third paints directly to the pixel buffer (FIG. 6).

As indicated above, each painter maker in a painter maker chain creates a painter for use by a rendering routine to render to a display device. See step 308 in FIG. 3. Specifically, when a painter maker is called to make a painter it must call the next painter maker in the chain and chain its painter to the painter returned. Of course the last painter maker need not do this. Each painter chain will directly parallel the painter maker chain that creates it. However, this need not always be the case. Painter makers can create multiple contiguous painters in the chain. Or a painter maker can decide not to make a painter (for instance, if no clipping is necessary) by simply returning the painter returned to it by the next painter maker.

Figure 7:
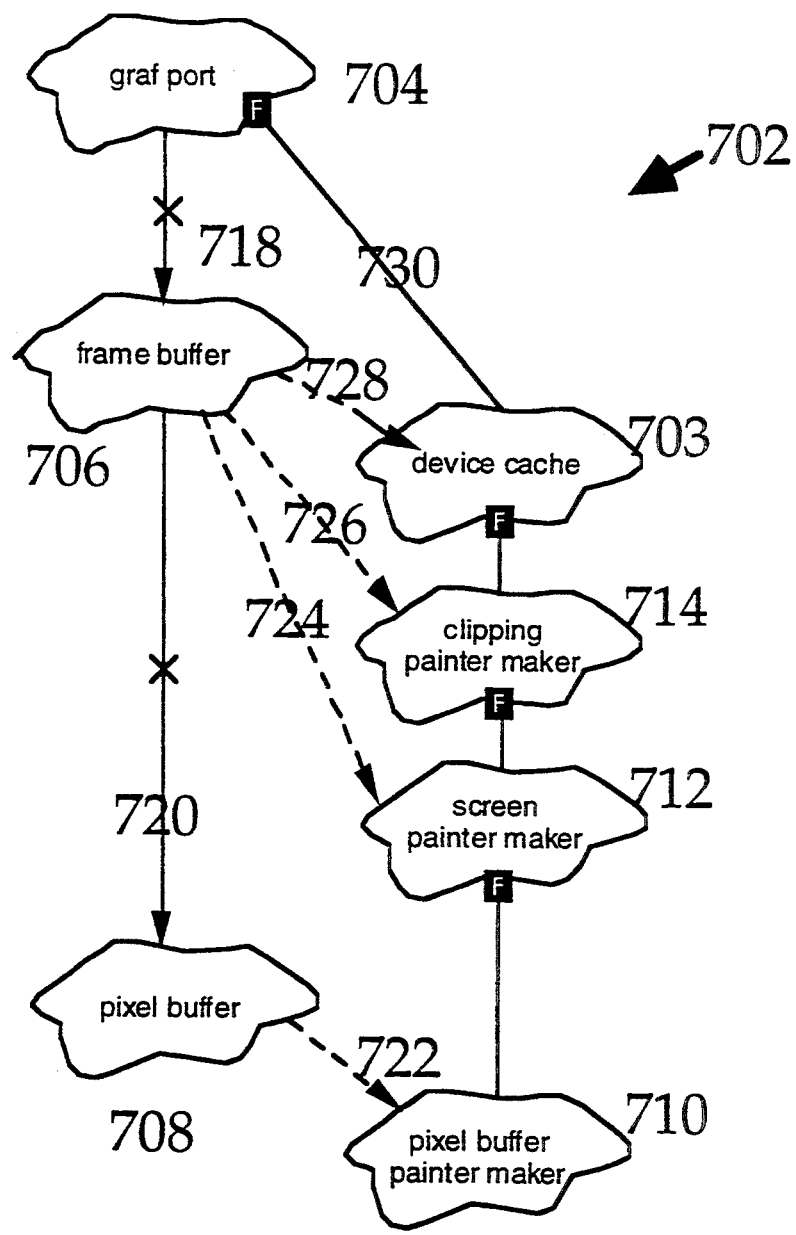
FIG. 7 illustrates a procedure for creating a painter maker for a graf port in accordance with a preferred embodiment of the present invention.

The manner in which a painter maker chain is created shall now be described with reference to FIG. 7. Preferably, a painter maker chain is instantiated and installed during the construction of a grafport 204 on a grafdevice 208, wherein the grafport 204 is associated with a particular task 202 and the grafdevice 208 is associated with a particular display device 126. When a graf port 204 is instantiated, the graf port constructor calls a grafdevice method called CreateGrafCache (this is indicated in FIG. 7 by line 718). The example depicted in FIG. 7 deals with a frame buffer display device, and therefore the grafdevice 208 is represented as a frame buffer object 706.

CreateGrafCache generates the cache 203 which will ultimately be stored in the newly created grafport 204. During construction of the cache 203, the frame buffer object 706 calls a CreatePainterMaker method in a pixel buffer object 708 (indicated by line 720 in FIG. 7). The pixel buffer object 708 is preferably associated with the display device 126, which as stated above is a frame buffer display device in the example of FIG. 7.

The CreatePainterMaker method preferably operates to create and return a pixel buffer painter maker object 710 (indicated by line 722 in FIG. 7). The pixel buffer painter maker object 710 is instantiated from the painter maker class (Code Example 2, above), wherein its methods have been overwritten as necessary to implement its particular functionality. Specifically, the pixel buffer painter maker 710 creates painters for the given pixel buffer type.

Using the pixel buffer painter maker 710 that is returned, the frame buffer object 706 constructs a screen painter maker 712 (if the frame buffer represents a screen; this is indicated by line 724 in FIG. 7). Using the screen painter maker object 712, the frame buffer object 706 constructs a clipping painter maker 714 (indicated by line 726 in FIG. 7). Finally, the frame buffer 706 (or, equivalently, the grafdevice 208) assigns the clipping painter maker 714 to the painter maker field in the device cache 203 and stores the device cache 203 in the grafport 204. The grafport 204 now owns the device cache 203 and passes it to the grafdevice 208 with each render call.

4. Operation of the Present Invention

The operation of the present invention shall now be described in detail.

Each grafdevice 208 is passed a device cache 203 with each rendering call from the grafport 204. The device cache 203 provides a pointer to the top-most painter maker. Each painter maker in the chain points to only the next painter maker in the chain. The device creates and links the chain as part of creating the cache, so new painter maker chains are installed by subclassing the device.

Rendering routines use the installed painter maker to make their painters. Consequently, the same rendering code can render into a screen or region, or any other accepting object. The rendering methods have no knowledge of this. They call the painter maker polymorphically, and it returns a painter which polymorphically performs the appropriate graphical operations.

As noted above with reference to FIG. 3, in response to receiving the primitive drawing message from the task 202, the grafport 204 sends a message to a grafdevice object 208 to cause the grafdevice object 208 to execute a rendering method defined by the grafdevice object 208. The message sent from the grafport 204 to the grafdevice 208 includes the cache 203. In response to receiving the message from the grafport 204, the grafdevice object 208 executes a rendering method (or routine) identified by the message.

Preferably, the painter architecture of the present invention is invoked inside the rendering routine. Accordingly, the operation of the painter architecture (that is, the operation of painter makers and painters) of the present invention shall be described with regard to the example render routine shown in Code Example 3, below.

```
/*================
| |Copyright © 1993 Taligent, Inc.
*/
void TSomeClass::Render ( ... )
{
    //Setup
    ...
    //Segment A: Construct a drawing lock
    TDrawingLock<TSpanPainter>lock (bounds, paint, transfermode, grafstate,
device→GetPainterMakero );
    unsigned long bottom = 0;
    TLongRect drawrect;
    //Segment B: We will draw multiple segments, but always between bounds left and
    //right
    drawRect.fLeft = bounds.fleft;
    drawRect.fRight = bounds.fright;
    //Segment C: Draw several segiments
    while (bottom <bounds.fbottom ) I
        //Segment D: Start where we left off in last loop, or at 0 the first time
        drawRect.frop = bottom;
        drawRect.fBottom = HowFarShouldWeGoo;
        //Segment E: Acquire lock/painter
        TSpanPainter* painter;
        lock.Acquire (drawrect, bottom, painter);
        //Segment F: The bottom parameter is used by the drawing lock to
        //return the extent of the requested drawrect that the rendering
        //routine has been granted. The painter that is retumed may only
        //be used to draw this far. This feature is provided since there are cases in
        //which the painter for the entire rectangle would be much more expensive
        //than the limited rectangle. In such a case, the inexpensive painter is
        //returned
        //first for the limited bounds. After using the first painter, the renderer
        //requests another painter for the remaining rectangle and may get an
        //expensive painter for a smaller area. In fact, circumstances often change
        //permitting an inexpensive painter for the remaining bounds by the time
        //the renderer gets to it.
        //Segment G: Paint but stay in bounds defined by drawrect and don't draw
        //on or past bottom
        //Segment H: Release lock/painter - don't use painter past here
        lock.Release();
    {
    //Segment I: lock is automatically destructed upon returning from this routine
}
```
Code Example 3

The instruction "TDrawingLock" (Segment A in Code Example 3) operates to construct a drawing lock, which is an object instantiated from a template class which takes the type of a painter class. As described below, a special drawing lock is provided for simultaneous use of two painters. The drawing lock object can be created at any point in the routine before painter methods are called. The main purpose for this class, as far as the task is concerned, is to handle exception unwinding for painters and painter support objects. In the event of an exception thrown in rendering the code, synchronization locks must be released and painter objects deallocated. For this reason, drawing locks are preferably allocated on the stack. The drawing lock also does some caching so that subsequent Acquire, Release, and painting calls (discussed below) will be as fast as possible.

Acquire and Release are methods of the drawing lock. These drawing lock methods call the methods of the painter maker which cause the painter maker to create a painter for use by the rendering routine. In an alternate embodiment of the present invention, drawing locks are not used. Instead, painter maker methods are called directly from the rendering routine.

When the renderer (that is, the rendering routine) is ready to call a painter method (in order to render to a display device), it creates a painter pointer that matches the type it gave to the drawing lock template, and calls the Acquire method of the drawing lock (Segment E). The drawing lock's Acquire method modifies this pointer to point to an appropriate painter, which is generated by the painter maker chain (specifically, the Acquire method calls the appropriate methods of the painter maker chain, which in turn generate the painter). Depending on the dynamic environment, the drawing lock will return painters that can clip to a region, participate in multi-threaded access to a shared device, perform compositing operations, verify correctness, or paint into a region structure. The renderer never knows where its pixels are going.

In order to return the correct painter, the Acquire method needs to know the bounds of the region in which rendering is to be performed. This is the case, since the operation of some painters depend on the bounds in which the rendering is to be performed (for example, a clipping painter). Such bounds are passed to the rendering routine via the bounds parameter. Note that this bounds parameter is passed in the call that creates the drawing lock (Segment A). Also, this bounds parameter is accessed to determine the left and right bounds of the area in which rendering is to be performed (Segment B). Further, this bounds parameter is accessed to define the exit condition in the while loop (starting at Segment C) which is used to vertically iterate through the area in which rendering is to be performed. The sub-area in which rendering is to be performed during each iteration of the while loop (Segment C) is defined by the statements in Segment D. Once the rendering routine has the painter (which was returned by the Acquire method in Segment E), the rendering routine uses the painter to render to the display device. In particular, the rendering routine calls appropriate methods of the painter, and these painter methods render to the display device. This is represented by Segment G, although actual calls to the painter methods are not shown since they are implementation dependent. After the rendering routine has performed all of the graphical rendering operations which it wishes to perform in the sub-area defined by the statements in Segment D, the rendering routine releases the painter (Segment H) and starts drawing the next sub-area by iterating again in the while loop.

To ensure responsiveness of interactive screen elements such as cursors and sprites, the renderer is obliged to keep computation between the Acquire and Release calls to a minimum.

As discussed above, the drawing lock calls the methods of the painter maker objects (although, alternatively, the rendering routine could directly call these painter maker methods). A device has one active painter maker, which the drawing lock retrieves from the device cache. Presented below in Table 1 is a chronological outline of the calls that are made to both the drawing lock and the painter maker (as discussed above), and a short comment about the functionality of each.

TABLE 1

| | | |
|---|---|---|
| 1. | TDrawingLock::TDrawingLock | (creates the drawing lock; called by the rendering routine) |
| 2. | TPainterMaker::UsePaint | (caches paint info; called by TDrawingLock) |
| 3. | TDrawingLock::Acquire | (gets painter; called by the rendering routine) |
| 4. | TPainterMaker::StartDrawing | (generates dynamic painter; called by Acquire) |
| 5. | TDrawingLock::Release | (called when finished painting current bounds; called by the rendering routine) |
| 6. | TPainterMaker::StopDrawing | (discard dynamic painter, caned by TDrawingLock) |
| 7. | TDrawingLock::~TDrawingLock | (done painting for good; automatically called when exiting rendering routine) |
| 8. | TPainterMaker::DoneWithPaints | (discard paint caches; called by the destructor of drawing lock) |

5. Example

The present invention shall now be further described through use of a rendering example wherein rendering is being performed on a screen device which must deal with clipping, compositing, and multi-thread synchronization. This section describes the painter makers that are used in this situation, and their responses to the calls outlined above in Table 1.

As mentioned before, after the drawing lock is created (Segment A in Code Example 3), the drawing lock begins by retrieving a painter maker from the device cache 203. The device cache 203 might contain a simple or complex painter maker depending on the device and the current environment. In this example, the painter maker returned by the device cache is a complex painter maker, consisting of three painter makers, as shown in FIG. 5.

The drawing lock first calls the painter maker's UsePaint method. In this call, the drawing lock specifies the type of painter it wants to use (from information provided by the statement in the rendering routine which created the drawing lock). As shown in Code Example 2, the painter maker class defines a UsePaint method for the following types of painters: span painter, hairline painter, bitmap glyph painter, and 3D span painter. However, other types of painters are within the scope and spirit of the present invention. Other parameters passed to UsePaint describe the type of painting to be performed. For example, the paint parameter specifies the color. The transfermode parameter specifies how the paint is to be applied (for example, to make the rendered image translucent). The bounds parameter specifies the area to which painting is to be performed.

UsePaint enables low-level painter makers (such as the pixel buffer painter maker 508) to cache a painter for this painting operation, thereby further enhancing performance. Suppose the pixel buffer painter maker 508 creates and caches a painter during the operation of UsePaint. In order to create the correct painter, TPixelBufferPainterMaker 508 needs to know both the paint and the painter type (TSpanPainter, TGlyphPainter, etc.). A NIL pointer of the appropriate painter class is passed down to select the appropriate overridden UsePaint call. TPixelBufferPainterMaker looks at the value contained in the paint parameter and decides whether the corresponding painter will be fast to create, or whether it should be cached. If the painter is a candidate for caching, it might already be in its cache, and the pixel buffer painter maker 508 looks there. In any case, it either creates the painter or retrieves it from the cache. Then it stores a pointer to the painter in a special slot inside the painter maker 508, where it will be retrieved with no lookup expense during each part of the dynamic phase.

Jumping forward for a moment, we see that the corresponding TPainterMaker::DoneWithPaints method allows TPixelBufferPainterMaker 508 to delete its painter, if necessary. This method is called by the drawing lock's destructor.

The dynamic phase of the painter architecture begins when the renderer is ready to actually start drawing pixels. Note that an arbitrary amount of initialization or computation may have been expended since the drawing lock was created. To notify the painter architecture of its immediate intent to begin painting, the renderer calls the Acquire method of the drawing lock in Segment E of Code Example 3.

The Acquire method calls the painter maker StartDrawing method for the appropriate painter (see Code Example 2, wherein it is shown that the painter maker object has a StartDrawing method for each painter type). Paintermakers employ the StartDrawing method to dynamically determine what kinds of clipping, compositing, and multi-thread synchronization will be necessary. It is allowed to divide rendering of a single primitive into multiple smaller passes through the painter architecture, where each pass addresses a uniform problem as far as clipping and compositing are concerned. This is accomplished by granting less than the original bounds: the painter maker can modify the boundsBottom parameter to restrict rendering. Note that the bounds can be restricted only in the vertical direction. When the Acquire method returns, the renderer is allowed to modify scanlines up to (but not including) boundsBottom until the lock is released and reacquired.

The StartDrawing call is propagated down the painter maker chain, starting with the TClippingPainterMaker 504. Each painter maker responds in the following fashion. It first checks its environment to determine if it wants to restrict the bounds rectangle. If so, it modifies the boundsBottom parameter to be the minimum of its current value and the painter maker's restriction. (Suppose boundsBottom is currently 30, and the TScreenPainterMaker 506 wants to restrict painting to scanline 20 in order to avoid a sprite that starts at scanline 21.) Next, the painter maker calls the StartDrawing method of the next painter maker in the chain to get its painter. Then, the current painter maker chains its own painter, if necessary, on top of the painter returned by the next painter maker.

In our example, TClippingPainterMaker 504 calls the StartDrawing method of TScreenPainterMaker 506 (TClippingPainterMaker 504 does all of its work after lower-level StartDrawing methods have finished). TScreenPainterMaker 506 intersects the bounds rectangle with the bounds of various composited items such as sprites and rubberbands. If any intersections are noted, the boundsBottom value may be restricted so that the most efficient painter can be used. Then a screen shield the size of the bounds (modified by boundsBottom) is created to ensure exclusive access to that part of the screen. Then, TScreenPainterMaker 506 calls the StartDrawing method of TPixelBufferPainterMaker 508.

TPixelBufferPainterMaker 508 retrieves the painter it created from its cache during the UsePainter method. Remember, StartDrawing may be called many more times than UsePaint, so all of the lookup and/or creation expense are put in UsePaint, and StartDrawing is highly optimized. Some painters need to know the bounds of the rectangle they will be drawing into (to cache their own pointers, offsets into patterns, or to lock memory), so TPixelBufferPainterMaker 508 calls a SetBounds method of the painter to convey this information. Then it returns this painter which it has created. Since the pixel buffer normally has no constraints on the bounds of drawing, the boundsBottom parameter is not usually modified. Clipping to the bounds of the device is performed earlier in the pipeline.

In the discussion contained herein, when it is said that a painter maker "creates" a painter, what is meant is that a painter maker object instantiates a new painter object. The new painter object is instantiated using the appropriate painter class (recall that there is a different painter class for each graphical primitive). See Code Example 1. In instantiating the new painter object, class methods are overridden as necessary such that the painter object can perform the desired function in the particular graphical environment in which rendering is to be performed.

Control returns to the StartDrawing method of TScreenPainterMaker 506. To create an appropriate painter chain, each painter in the painter chain contains a pointer to the next painter in the chain, so the existence of the chain is implicit rather than an explicit external list. Each paintermaker in the paintermaker chain creates zero or more painters and chains them to the painter returned from the next paintermaker in the paintermaker chain. TScreenPainterMaker 506 creates and returns the most appropriate (i.e., the most efficient) painter. In many situations, more than one painter will be required to do the job in an optimal fashion. For example, a line that is about to be rendered underneath two sprites might use a simple pixel buffer painter to paint a portion of the line that is not obscured, then a single compositing painter to paint the portion of the line that lies under one sprite, then a multiple compositing painter to paint the portion that lies underneath both sprites, and finally a simple painter to paint directly to the screen again.

Because the painter architecture of the present invention preferably allows only one painter to be returned at a time, TScreenPainterMaker 506 returns the first painter, and the boundsBottom parameter is modified so that the renderer is forced to make additional drawing lock Acquire calls to get the other painters. Although this is relatively complicated, it saves a lot in terms of unnecessary compositing overhead, back buffer allocation, and duration of shielding (which impacts responsiveness of sprites). Also, this behavior is tunable by the compositing architecture, so if a single complex painter performs better than multiple acquires of the lock, this can be accomplished without modifying any rendering code.

At this point, control returns to TClippingPainterMaker 504. It receives a painter that is either the simple pixel buffer painter (if no compositing needs to be done) or a compositing painter wrapper. TClippingPainterMaker checks for intersections between the bounds rectangle (modified by boundsBottom) and the clipping region. If no intersections are found, it returns the painter and boundsBottom value it got from the painter makers beneath it. Otherwise, it adds a clipping painter to the painter chain. It is allowed to modify boundsBottom if it wants to break up drawing in the same way TScreenPainterMaker 506 does.

Then control returns to the Acquire method of TDrawingLock. A painter has been returned to the Acquire method, wherein the returned painter may be a chain of painters, depending on the dynamic environment to be drawn in. The painter and the boundsBottom values are returned to the drawing lock client (that is, the rendering routine).

The renderer proceeds to make calls (represented by Segment G in Code Example 3) on the painter it gets from TDrawingLock. These calls take the following form (for a span painter, at least; other painters have different methods):

spanPainter->PaintSpans(...);

When rendering on screen devices, painter calls are time-critical. Therefore, a renderer should perform any significant calculations before the Acquire or after the Release methods are called.

When the renderer is done, or when it has reached the boundsBottom value, or when it wants to pause to perform more calculation between painter calls, it calls TDrawingLock::Release (Segment H in Code Example 3). This calls the painter maker's StopDrawing method. The StopDrawing methods of TClippingPainterMaker 504, TScreenPainterMaker 506, and TPixelBufferPainterMaker 508 are called in order. TClippingPainterMaker 504 doesn't have much to do, unless it wants to delete the clipping painter it created during the StartDrawing pass. TScreenPainterMaker 506 releases the screen shield, allowing other threads to modify this portion of the screen again. TPixelBufferPainterMaker 508 probably doesn't do anything (destruction of its painter is not done until the subsequent DoneWithPaints call, because additional StartDrawing calls are possible using this painter).

The renderer may call TDrawingLock's Acquire and Release methods multiple times, either in accordance with its own algorithms, or in response to boundsBottom restrictions imposed by the painter makers. When it is finally done, the stack-based TDrawingLock is automatically destructed upon exit from the rendering routine. At this time, the painter makers get one final call, DoneWithPaints, which is passed to each painter maker. At this time, it is appropriate for TPixelBufferPainterMaker 508 to delete or cache the painter it was using. Whether painter makers delete or cache their painters, and whether they do this in the StopDrawing call or the DoneWithPaints call depends on the useful persistence of the painters they create.

6. Two Simultaneous Painters

Some renderers want to use two painters simultaneously, to do filling and framing, for instance. It is important to anticipate this usage, because many things are shared by the two painters (the bounds rectangle, the clipping and screen painters, and the screen shield). This is not just a performance win. If these painters are treated independently, problems would arise if they try to reserve the same screen shield.

The present invention supports the use of two simultaneous painters by a special drawing lock, TDoubleDrawingLock. The two painters can be of the same or different classes. Preferably, no more than two painters will ever be simultaneously active. This restriction allows for optimized caching of a fixed number of painters at the TPixelBufferPainterMaker level. Following is sample code from a two-painter renderer:

```
Render (grafstate, devicecache)
{
    //we have determined that we need to do filling and framing
    const TAttributeState* attributestate = grafState.GetAttributeStateo;
    TDoubleDrawingLock<TSpanPainter,TSpanPainter>lock(
        bounds,
        attributeState→GetFillPainto,
        attributeState→GetFillTransferModeo,
        attributeState→GetFramePainto,
        attributeState→GetFrameTransferModeo,
        grafState, devicecache);
    if (!bounds.IsEmpty0 {
        TSpanPainter* filler;
        TSpanPainter* framer;
        unsigned long boundsbottom;
        //this will be in a loop
        lock.Acquire(bounds, boundsbottom, filler, framer);
        filler→PaintSpans(...)
        framer→PaintSpans(...)
        ...
        lock.Release0;
    }
}
Code Example 4
```

The operation of the rendering routine in Code Example 4 and, in particular, the calls to and subsequent operation of the painter makers of the present invention, is similar to the single-painter renderer, except the drawing lock calls some painter maker methods multiple times, and others it calls only once. For example, it is only necessary to call the TrimBounds method once, because the same clipping region will be used for both painters. On the other hand, two UsePaint calls are made in order to cache both painters in the lowest painter maker. In this case, TPixelBufferPainterMaker should have a strategy for caching two active painters at a time, and be able to return them quickly during the StartDrawing call. Although there are two UsePaint calls, only one DoneWithPaints call is necessary.

TDoubleDrawingLock specifies which painter it requires in each call to TPainterMaker::StartDrawing. Painter makers such as the clipping and screen painter makers do redundant work only for the first painter. For example, the screen painter maker reserves a screen shield only during the first pass. If it tried to do it again during the second pass, it would block forever.

7. Verification Painter

There are a variety of ways for writers of rendering code to improperly use the painter makers and painters of the present invention. In order to provide a user friendly and robust environment in which programmers can work, the present invention provides features for catching any mistakes which a programmer might make. Listed below are the mistakes which are caught by the present invention:

- The bounds passed to TDrawingLock::Acquire is bigger than the bounds passed to the drawing lock constructor.
- A painter call is made outside of the bounds (modified by boundsBottom) in TDrawingLock::Acquire.
- A painter call is made outside of the drawing lock Acquire/Release pair.
- A painter call is made after the painter's lock is destructed.

Each of these would be relatively easy to check for (using an Assertion) if the drawing lock was passed as a parameter to each painter method. However, since there are no other architectural reasons for painters to know about drawing locks, this solution is not ideal.

A better solution involves a conditionally installed verification painter maker in the painter maker chain, which performs correctness checks as follows.

In the verification painter maker's StartDrawing method, the bounds rectangle is compared to the bounds that it cached during the UsePaint call. The new bounds (modified by boundsBottom) are copied into the painter it returns.

The painter intercepts each painter call and checks it against these bounds. If any painter call exceeds the bounds, an assertion is raised.

The painter maker's StopDrawing call doesn't delete the verification painter, but instead just sets the bounds to empty. Any attempt to draw after the drawing lock Release call will raise an assertion.

It is difficult to detect usage of the painter after the drawing lock has been destructed, because the verification painter will itself be destructed in response to the DoneWithPaints call. If its virtual table is still intact, it is possible that the deleted verification painter will be called. In this case, it is likely that its bounds will still be empty, and the attempt will probably raise an assertion. This cannot be guaranteed, however. This is in distinction to the solution which uses lock parameters, which can guarantee that no painter can be called without a lock.

8. Creating a Clip Region

Another problem this architecture is intended to solve concerns the creation of clipping regions. In order to create such a region, a renderer has to use a special painter that paints into a region instead of the normal pixel buffer, but we want to reuse all of the same rendering pipeline code. With this new architecture, we can easily solve this problem by inserting a different painter maker in the device cache, one that knows how to make special region painters. This painter maker is called the CreateRegion painter maker.

Figure 8:
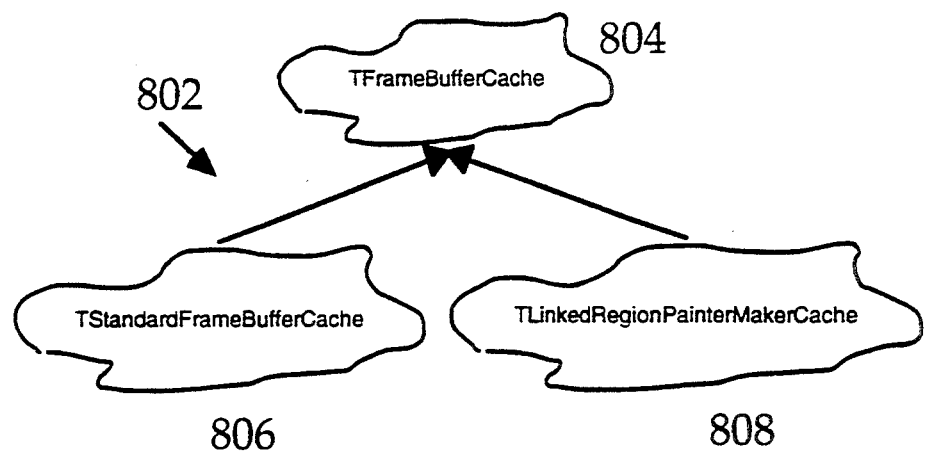
FIG. 8 illustrates a clip region class diagram in accordance with a preferred embodiment of the present invention.

In order to do this in true object-oriented fashion, the CreateRegion painter maker does not just adjust the internals of the device cache. Instead, it creates a framebuffer cache subclass 804 (see FIG. 8) that acts just like the normal framebuffer cache, except when it is asked for its painter maker. At that time, it returns its special TRegionPainterMaker which creates painters that "paint" into a special, device-dependent region data structure.

In order to subclass the framebuffer cache in a lightweight fashion, TFrameBufferCache 804 is a lightweight abstract class with two subclasses: TStandardFrameBufferCache 806 and TLinkedRegionPainterMakerCache 808. TLinkedRegionPainterMakerCache 808 implements only a GetPainterMaker method, which when called causes the cache to return its painter maker (that is, the painter maker stored therein). All others are routed back to the TFrameBufferCache 804 with which TLinkedRegionPainterMakerCache 808 is constructed. The CreateRegion painter maker passes its special framebuffer cache 808 into any rendering method it calls.

9. Pixel Streamers

The architecture thus far described works fine for any rendering routine which uses painters. However, the architecture of the present invention provides a few other ways to write into a pixel buffer. One of the most important cases involves pixel streamers, which are used for most image rendering operations.

The main difference between pixel streamers and painters is that pixel streamers can come in pairs (a reader and a writer) in order to convert pixel data from one format to another. This pairing is optional, however. When the source and destination pixel buffer share the same format, only one pixel streamer is needed to handle the job. In situations where two streamers are needed, the reader can be allocated and initialized once, because it is not subject to the same dynamic constraints that affect the writer (clipping, compositing, multi-thread synchronization). The reader always reads from an off-screen buffer (this is an architectural restriction). Conversely, the writer is subject to the same dynamic considerations as painters.

Because of the many similarities shared with painters, pixel streamers are handled through the same painter maker classes. Because of the differences, new methods are required within the painter maker classes, and a different flavor of drawing lock is employed. These cannot be unified without passing many parameters that would be unused in one case or the other (streamers don't use a TPaint parameter, for example).

The similarities and differences can be seen in the example shown in Code Example 5, below:

```
RenderImage (TGImage&, grafstate, devicecache)
{
```

```
//painter makers are kept in TFrameBufferCache
TPainterMaker* paintermaker = deviceCache.GetPainterMakero;
//bounds is a rectangle circumscribing the primitive which is
//about to be rendered
painterMaker→TrimRect(bounds, grafstate);
if (!bounds.IsEmptyo) I
    TPixelStreamerDrawingLock lock
        bounds, grafstate, devicecache);
    //allocate reader once only
    TPixelStreamReader* reader = lock.GetPixelStreamReader
        grafState.GetAttributeStateo→GetImageTransferModeo,
        grafState, sourcePixelBuffer, destinationPixelBuffer,
        TPainterMaker::kSomeReaderRequired);
    TPixelStreamWriter* writer;
    unsigned long boundsbottom;
    //this will be in a loop
    lock.Acquire(bounds, boundsbottom, writer);
    TPixelBuffer *intermediatebuffer = writer-
>CreateNewScanlineBuffer( . . . );
    (reader→*readRowOrColumnOfPixels)(intermediateBuffer);
    writer→SetPixelRows(intermediateBuffer);
    ...
    delete intermediatebuffer;
    lock.Release();
    }
}
Code Example 5
```

As can be seen in this example, the code to perform trivial reject clipping and drawing lock construction is similar to that used for painters. One difference is that TPixelStreamerDrawingLock is not a template class, because different pixel streamers all descend from a common base class, which is not the case for painters.

The biggest difference is an extra call on the drawing lock, GetPixelStreamReader. The pixel stream reader only has to be allocated once, while the pixel stream writer may be dynamically wrapped to allow clipping, compositing, and multi-thread synchronization. For performance reasons, this expensive lookup is moved out of the Acquire call, which may be executed multiple times. The last parameter to the GetPixelStreamReader call is an enum which is used to distinguish between situations where a reader is not wanted (a single pixel streamer is sufficient to transfer between two pixel buffers with the same pixel format), where a reader is optional (the pixel buffer determines whether conversion is necessary), and where a reader is required (certain filtering options assume a particular pixel format).

10. ScrollArea

The drawing lock support for image rendering makes an important assumption for performance reasons. It assumes that the reader does not have to worry about clipping, compositing, or multi-thread synchronization issues. In other words, the reader must read from non-shared, off-screen data.

This assumption precludes screen-to-screen copying of the kind needed to support scrolling. Screen device subclasses implement a scrolling method in a way that makes sense for that particular screen device. At worst, the entire screen can be locked, pixel information can be transferred into an off-screen buffer (taking into account sprites, of course), and the off-screen buffer can be written to its new screen position afterwards. In most cases, more efficient alternatives will be available.

11. 3D Support 3D rendering is similar to that of 2D, except that the drawing lock constructors take a shader object which implements extensible shading algorithms instead of a painter and a transfer mode. There are still single and double drawing locks for 3D and these are still templatized, but preferably only double drawing locks for two 3D span painters are used. Here is an example that illustrates the use of 3D drawing locks.

```
Render3D (grafstate, devicecache)
{
    const TAttributeState* attributestate =
grafState.GetAttributeStateo;
    TDoubleDrawingLock3D<T3DSpanPainter,T3DSpanPainter-
>lock
        bounds,
        bundle→GetInsideShadero,
        bundle→GetOutsideShadero,
        grafState, *deviceCache);
    if (!bounds.IsEmptyo) f
        T3DSpanPainter* insidepainter;
        T3DSpanPainter* outsidepainter;
        unsigned lmg boundsbottom;
        //this will be in a loop
        lock.Acquire(bounds, boundsbottom, insidepainter,
outsidepainter);
        insidePainter→Render( . . . );
        outsidePainter→Render( . . . )
        lock.Release();
    }
}
Code Example 6
```

12. Extensibility

The present invention can be extended by (1) subclassing TPainterMaker to create new types of painter makers, and (2) installing such new painter makers into the painter maker chain. New painter maker installation is achieved by either subclassing the pixel buffer, which the device calls to create the last painter maker in the chain, or by subclassing the device, which has an opportunity to layer other painter makers on top of the one that its pixel buffer returns.

A painter maker can cache painters for which it anticipates future need. To do so, it stores the cache as member data. The TPainterMaker::UsePaint and TPainterMaker::DoneWithPaints methods give each painter maker in the chain an opportunity to allocate and deallocate caches.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

Having thus described our invention, what we claim as new, and desire to secure by Letters Patent is:

1. A computer based system for rendering a plurality of graphical primitives in a plurality of graphical environments, comprising:

a plurality of painter maker objects;

a painter maker chain comprising at least one of the plurality of painter maker objects;

graphical rendering means for passing to the painter maker chain a graphical rendering request to render a graphical primitive in a current graphical environment;

the at least one painter maker object in the painter maker chain comprising painter creating means for creating, in response to receipt of the graphical rendering request and in response to the current graphical environment, a painter object comprising methods to perform a graphical operation with respect to rendering the graphical primitive, the painter object creating means further including means for chaining the painter object into a painter object chain, the painter object chain comprising painter objects having methods for performing graphical operations to satisfy the graphical rendering request; and the graphical rendering means also comprising means for using the painter object chain generated by the at least one painter maker object in the painter maker chain to perform rendering operations in the current graphical environment.

2. The system of claim 1, wherein each of the painter maker objects comprises means for generating a span painter.

3. The system of claim 1, wherein each of the painter maker objects comprises means for generating a hairline painter.

4. The system of claim 1, wherein each of the painter maker objects comprises means for generating a glyph painter.

5. The system of claim 1, wherein each of the painter maker objects comprises means for generating a three dimensional span painter.

6. The system of claim 1, wherein each of the painter maker objects comprises means for generating a painter to perform clipping.

7. The system of claim 1, wherein each of the painter maker objects comprises means for generating a painter to perform compositing.

8. The system of claim 1, wherein each of the painter maker objects comprises means for generating a painter to write to a pixel buffer.

9. The system of claim 1 in which there is defined a plurality of painter base classes each associated with one of the graphical primitives, wherein the painter creating means comprises means for creating painter objects using the painter base classes.

10. A computer implemented method of rendering a plurality of graphical primitives in a plurality of graphical environments, comprising:

(a) generating a painter maker chain for a task, the painter maker chain comprising a plurality of painter maker objects;

(b) receiving from the task a request to render a particular graphical primitive in a current graphical environment;

(c) using, in response to receipt of the render request, the plurality of painter maker objects in the painter maker chain to create a chain of painter objects, each of the painter objects performing a graphical operation so that the chain of painter objects performs a plurality of graphical operations which satisfy the render request; and (d) using the chain of painter objects to perform rendering operations in the current graphical environment.

11. The method of claim 10, wherein step (c) comprises the steps of using the painter maker objects in the painter maker chain to create a span painter, and adding the span painter to the painter chain.

12. The method of claim 10, wherein step (c) comprises the steps of using the painter maker objects in the painter maker chain to create a hairline painter, and adding the hairline painter to the painter chain.

13. The method of claim 10, wherein step (c) comprises the steps of using the painter maker objects in the painter maker chain to create a glyph painter, and adding the glyph painter to the painter chain.

14. The method of claim 10, wherein step (c) comprises the steps of using the painter maker objects in the painter maker chain to create a three dimensional span painter, and adding the three dimensional span painter to the painter chain.

15. The method of claim 10, wherein step (c) comprises the steps of using the painter maker objects in the painter maker chain to create a painter to perform clipping, and adding the clipping painter to the painter chain.

16. The method of claim 10, wherein step (c) comprises the steps of using the painter maker objects in the painter maker chain to create a painter to perform compositing, and adding the compositing painter to the painter chain.

17. The method of claim 10, wherein step (c) comprises the steps of using the painter maker objects in the painter maker chain to create a painter to write to a pixel buffer, and adding the pixel buffer writing painter to the painter chain.

18. The method of claim 10 in which there is defined a plurality of painter base classes each associated with one of the graphical primitives, wherein step (c) comprises the step of creating painter objects using the painter base classes.

19. A computer based system for rendering a plurality of graphical primitives in a plurality of graphical environments in response to a rendering request, the system comprising:

means for creating a plurality of painter maker objects, each of the plurality of painter maker objects having means for creating a painter object which performs a predetermined graphical environment operation;

means, responsive to the rendering request, for invoking the means for creating a plurality of painter maker objects to create a plurality of painter objects which perform a series of graphical environmental operations in a current one of the plurality of graphical environments; and means for using the painter objects to paint graphical primitives to satisfy the rendering request in accordance with the current one graphical environment.

20. The system of claim 19 wherein the means for creating a plurality of painter maker objects includes means responsive to the rendering request for creating a clipping painter maker object.

21. The system of claim 19 wherein the means for creating a plurality of painter maker objects includes means responsive to the rendering request for creating a compositing painter maker object.

22. The system of claim 19 wherein the means for creating a plurality of painter maker objects includes means for connecting together painter objects created by the plurality of painter maker objects, in an ordered sequence to form a painter object chain.

23. The system of claim 22 wherein the means for creating a plurality of painter maker objects includes means for connecting together a plurality of painter objects for painting a graphical primitive.

24. The system of claim 23 wherein the means for creating a plurality of painter maker objects includes means for temporarily storing a painter object for painting a graphical primitive and means for retrieving the stored painter object to incorporate the retrieved painter object in subsequently created painter object chains.

25. The system of claim 23 wherein the plurality of painter objects for painting a graphical primitive include a span painter object.

26. The system of claim 23 wherein the plurality of painter objects for painting a graphical primitive include a hairline painter object.

27. The system of claim 23 wherein the plurality of painter objects for painting a graphical primitive include a glyph painter object.

28. The system of claim 23 wherein the plurality of painter objects for painting a graphical primitive include a 3D span painter object.

29. The system of claim 19 wherein the means for creating a plurality of painter maker objects, includes means for creating the plurality of painter maker objects from a plurality of painter maker subclasses derived from a common painter maker base class, each of the plurality of painter maker subclasses comprising methods operable in one of the plurality of graphical environments.

30. The system of claim 29 wherein each painter maker subclass overrides a first virtual member function of the common painter maker base class to create subclass methods for creating, storing, and retrieving a painter object for painting a graphical primitive in one of the plurality of graphical environments.

31. The system of claim 29 wherein each painter maker subclass overrides a second virtual member function of the common painter maker base class to create subclass methods for creating a painter object which performs a predetermined graphical environment operation required in the current one of the plurality of graphical environments.

32. The system of claim 31 wherein the invoking means includes means for polymorphically invoking one of the subclass methods in one of the plurality of painter maker objects based on a graphical primitive type which is to be rendered.

33. The system of claim 32 wherein the common painter maker base class includes a third virtual member function for chaining a painter object created by a subclass method in one of the plurality of painter maker objects to another painter object created by a subclass method in another of the plurality of painter maker objects to form a painter object chain.

34. The system of claim 19 wherein the means for creating a painter object for performing a particular graphical environment operation includes means for creating a painter object from one of a plurality of painter subclasses, the one painter subclass being directed to a predetermined graphical environment operation and being derived from a painter base class that is used to render a predetermined graphical primitive.

35. The system of claim 34 wherein the means for using painter objects includes means for polymorphically invoking the painter objects.

36. A method for rendering a plurality of graphical primitives in a plurality of graphical environments in response to a rendering request, the method comprising the steps of:
   A. creating a plurality of painter maker objects, each of the plurality of painter maker objects, in turn, creating a painter object which performs a predetermined graphical environment operation;
   B. using the plurality of painter maker objects to create a plurality of painter objects which perform a series of graphical environmental operations in a current one of the plurality of graphical environments; and
   C. using the painter objects to paint graphical primitives to satisfy the rendering request in accordance with the current one graphical environment.

37. The method of claim 36 wherein step A comprises the steps of:
   A1. creating a clipping painter maker object in response to the rendering request.

38. The method of claim 36 wherein step A comprises the steps of:
   A2. creating a compositing painter maker object in response to the rendering request.

39. The method of claim 36 wherein step A comprises the step of:
   A3. connecting together painter objects created by the plurality of painter maker objects in an ordered sequence to form a painter object chain.

40. The method of claim 39 wherein step A3 comprises the steps of:
   A4. connecting together a plurality of painter objects for painting a graphical primitive.

41. The method of claim 40 wherein step A4 comprises the steps of:
   A5. temporarily storing a painter object for painting a graphical primitive;
   A6. retrieving the stored painter object; and
   A7. incorporating the retrieved painter object in subsequently created painter object chains.

42. The method of claim 40 wherein step A4 comprises the step of:
   A4A. including a span painter object in the plurality of painter objects for painting the graphical primitive.

43. The method of claim 40 wherein step A4 comprises the step of:
   A4B. including a hairline painter object in the plurality of painter objects for painting the graphical primitive.

44. The method of claim 40 wherein step A4 comprises the step of:
   A4C. including a glyph painter object in the plurality of painter objects for painting the graphical primitive.

45. The method of claim 40 wherein step A4 comprises the step of:
 A4D. including a 3D span painter object in the plurality of painter objects for painting the graphical primitive.

46. The method of claim 36 wherein step A comprises the steps of:
 A8. deriving a plurality of painter maker subclasses from a common painter maker base class, each of the plurality of painter maker subclasses comprising methods operable in one of the plurality of graphical environments; and
 A9. creating the plurality of painter maker objects from the plurality of painter maker subclasses.

47. The method of claim 46 wherein step A8 comprises the step of:
 A10. overriding a first virtual member function of the common painter maker base class to create subclass methods for creating, storing, and retrieving a painter object for painting a graphical primitive in one of the plurality of graphical environments.

48. The method of claim 46 wherein step A8 comprises the step of:
 A11. overriding a second virtual member function of the common painter maker base class to create subclass methods for creating a painter object which performs a predetermined graphical environment operation required in the current one of the plurality of graphical environments.

49. The method of claim 48 wherein step A11 comprises the step of:
 A13. creating a painter object from one of a plurality of painter subclasses, the one painter subclass being directed to a predetermined graphical environment operation and being derived from a painter base class that is used to render a predetermined graphical primitive.

50. The method of claim 36 wherein step C comprises the step of:
 C1. polymorphically using one of the subclass methods in one of the plurality of painter maker objects based on a graphical primitive type which is to be rendered.

51. The method of claim 46 wherein step A8 comprises the step of:
 A12. chaining a painter object created by a subclass method in one of the plurality of painter maker objects to another painter object created by a subclass method in another of the plurality of painter maker objects to form a painter object chain.

52. The method of claim 36 wherein step C comprises the step of:
 C2. polymorphically using the painter objects.

* * * * *